United States Patent [19]

Kedjierski

[11] Patent Number: 4,862,514

[45] Date of Patent: Aug. 29, 1989

[54] HYBRID ELECTRONIC RADIO REPEATER

[75] Inventor: Fred D. Kedjierski, Margate, Fla.

[73] Assignee: World Electronics, Inc., Coral Springs, Fla.

[21] Appl. No.: 934,267

[22] Filed: Nov. 24, 1986

[51] Int. Cl.$^4$ ............................................. H04B 7/14
[52] U.S. Cl. ........................................ 455/161; 455/20
[58] Field of Search ................... 455/161, 9, 10, 11, 455/13, 20, 22, 52, 164, 165, 57, 21, 23, 197; 370/75, 4

[56] References Cited

U.S. PATENT DOCUMENTS

| | | | |
|---|---|---|---|
| 3,201,691 | 8/1965 | Lyon | 455/22 |
| 4,169,993 | 10/1979 | Taylor | 455/161 |
| 4,214,205 | 7/1980 | Guest | 455/22 |
| 4,218,772 | 8/1980 | Sielman et al. | 455/20 |
| 4,298,989 | 11/1981 | Someno et al. | 455/161 |
| 4,317,218 | 2/1982 | Perry | 455/57 |
| 4,398,286 | 8/1983 | Geesen et al. | 370/75 |

Primary Examiner—Robert L. Griffin
Assistant Examiner—Curtis Kuntz
Attorney, Agent, or Firm—Malin, Haley & McHale

[57] ABSTRACT

An improved hybrid electronic radio repeater comprising an antenna means for receiving a select, narrow frequency band of radio wave signals, the radio wave signal(s) being transmitted from discrete sources wherein the radio wave signals contain source, status and control information. A radio frequency amplifier means filters and amplifies the radio signals and passes them to a mixing means. The mixing means, including a local oscillator means, combines the radio frequency signals with the local oscillator signals to produce intermediate frequency signals. The intermediate frequency signals are narrow filtered causing tuning by local oscillator tuning means. An intermediate frequency amplifier means detects and amplifies the IF signals and generates a signal strength level indication in response thereto. A control means, the control means being an intelligent unit capable of discerning information and generating responses thereto, monitors the signal strength level indications and also initiates the tuning voltage level of said narrow frequency band local oscillator tuning, for the presence of select radio wave signals, the control means tuning the hybrid radio repeater in response to the presence of the select signals.

20 Claims, 6 Drawing Sheets

HYBRID ELECTRONIC RADIO REPEATER

BACKGROUND OF THE INVENTION

Historically, super regenerative receivers have been utilized in amplitude modulated (AM) radio repeaters. Conventional super regenerative receivers are utilized with low cost, low power output transmitters. These transmitters are Federal Communication Commission (FCC) Part 15 transmitters which have such a low power output as to not require licensing. Since these transmitters are of an extremely low cost, they do not have a crystal oscillator or other frequency fixing device which would transmit with accuracy fixed frequency signals. These transmitters characteristically exhibit "frequency drifting" normally within a select frequency bandwidth. Therefore, the super regenerative receivers are able to receive a transmitted radio frequency signal within a particular bandwidth, and thereby inherently compensate for transmitter drift.

Super regenerative receivers are inherently wide band at the particular transmitted frequency which is disadvantageous in that it allows a similar bandwidth of noise to be received along with the preferred signal.

Utilizing a super regenerative receiver presents the problems of discriminating the reception of noise from preferred signals, the scrambling and loss of reception of simultaneously transmitted multiple signals, as well as compensating for the drift in transmitting frequencies and yet allowing one to receive proper RF signals. A problem is also presented in improving and designing electronic circuitry which would eliminate the above problems, and yet be cost effective in terms of design, manufacturing, and production.

It is therefore highly desirable to provide an improved hybrid electronic radio repeater which is a narrow band receiver greatly improving the signal-to-noise ratio of received signals from transmitters operating at a great distance from the receiver, and by its narrow band characteristic allows reception of simultaneously transmitted signals.

It is also highly desirable to provide an improved hybrid electronic radio repeater which greatly improves the reception of transmitted RF signals from low power output transmitters which do not require FCC licensing, and yet allows for low cost electronic components to be utilized in said receiver.

It is also highly desirable to provide an improved hybrid electronic radio repeater which maximizes the signal-to-noise ratio of received RF signals, and operates as a narrow band receiver.

It is also highly desirable to provide an improved hybrid electronic radio repeater which has an intelligent, digital processing system capable of discerning specific information data and generating specific responses thereto.

It is also highly desirable to provide an improved hybrid electronic radio repeater which can scan a select frequency band searching for preferred RF signals, and having the ability to automatically tune said radio repeater to frequency locations which optimize reception.

It is also highly desirable to provide an improved hybrid electronic radio repeater containing a digital processing unit which can initiate the transmission of data in response to received RF data, whether the transmission is a simulated transmission of the originally received signals, or a transmission of discrete, original data in response thereto.

It is also highly desirable to provide an improved hybrid electronic radio repeater which is cost effective yet operationally efficient.

It is also highly desirable to provide an improved hybrid electronic radio repeater having drift alarm zones which can alert an operator that a transmitter frequency is drifting beyond acceptable limits, as well as alert an operator as to other operational deficiencies in either the power of or distance to the transmitting source, or the operation of the repeater receiver itself.

It is also highly desirable to provide an improved hybrid electronic radio repeater which contains a digital processing system which can be utilized to scan a select frequency bandwidth searching for select RF signals, and upon sensing the presence of such RF signals initiate the fine tuning of said receiver to lock very accurately onto said select RF signals and thereby improve reception.

It is also highly desirable to provide an improved hybrid electronic radio repeater which can intelligently discriminate between varying RF signals and the transmitted data therein, and initiate ancillary support equipment in response to the transmitted data.

Finally, it is highly desirable to provide an improved hybrid electronic radio repeater having all of the above mentioned characteristics.

SUMMARY OF THE INVENTION

It is therefore an object of the invention to provide an improved hybrid electronic radio repeater which is a narrow band receiver greatly improving the signal-to-noise ratio of received signals from transmitters operating at a great distance from the receiver and transmitter.

It is therefore an object of the invention to provide an improved hybrid electronic radio repeater which greatly improves the reception of transmitted RF signals from low power output transmitters which do not require FCC licensing, and yet allows for low cost electronic components to be utilized in said receiver and transmitter.

It is therefore an object of the invention to provide an improved hybrid electronic radio repeater which maximizes the signal-to-noise ratio of received RF signals, and operates as a narrow band receiver.

It is therefore an object of the invention to provide an improved hybrid electronic radio repeater which has an intelligent, digital processing system capable of discerning information data and generating responses thereto.

It is therefore an object of the invention to provide an improved hybrid electronic radio repeater which can scan a select frequency band searching for preferred RF signals, and having the ability to automatically tune said radio repeater to frequency locations which optimize reception.

It is therefore an object of the invention to provide an improved hybrid electronic radio repeater containing a digital processing unit which can initiate the transmission of data in response to received RF data, whether the transmission is a simulated transmission of the originally received signals, or a transmission of discrete, original data in response thereto.

It is therefore an object of the invention to provide an improved hybrid electronic radio repeater which is cost effective yet operationally efficient.

It is therefore an object of the invention to provide an improved hybrid electronic radio repeater having drift alarm zones which can alert an operator that a transmitter frequency is drifting beyond acceptable limits, as well as alert an operator as to other operational deficiencies in either the power of transmitting source, or the repeater receiver circuitry itself.

It is therefore an object of the invention to provide an improved hybrid electronic radio repeater which contains a digital processing system which can be utilized to scan a select frequency bandwidth searching for select RF signals, and upon sensing the presence of such RF signals initiate the fine tuning of said receiver to lock onto said select RF signals and thereby improve reception.

It is therefore an object of the invention to provide an improved hybrid electronic radio repeater which can intelligently discriminate between varying RF signals and the transmitted data therein, and initiate ancillary support equipment in response to the transmitted data.

Finally, it is an object of the invention to provide an improved hybrid electronic radio repeater having all of the above mentioned characteristics.

Briefly, what is provided is an improved hybrid electronic radio repeater comprises an antenna means for receiving a select, narrow frequency band of radio wave signals, the radio wave signal(s) being transmitted from discrete sources wherein the radio wave signals contain source, status and control information. A radio frequency amplifier means filters and amplifies the radio signals and passes them to a mixing means. The mixing means, including a local oscillator means, combines the radio frequency signals with the local oscillator signals to produce intermediate frequency signals. The intermediate frequency signals are narrow causing filtered allowing accurate narrow band tuning by the local oscillator. An intermediate frequency amplifier means detects and amplifies the IF signals and generates a signal strength level indication in response thereto. A control means, the control means being an intelligent unit capable of discerning information and generating responses thereto, monitors the signal strength level indications and also initiates tuning voltage level scan of said narrow frequency band local oscillator tuning, for the presence of select radio wave signals, the control means tuning the hybrid radio repeater in response to the presence of the select signals.

BRIEF DESCRIPTION OF THE DRAWINGS

The above mentioned and other features and objects of this invention and the manner of obtaining them will become more apparent and the invention itself will be best understood by reference of the following description of an embodiment of the invention taken in conjunction with the accompanying drawings, wherein.

DESCRIPTION OF A SPECIFIC EMBODIMENT

Figure 1:
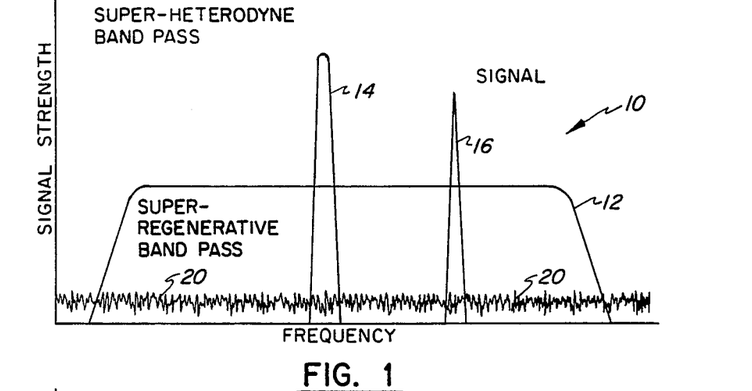
FIG. 1 is a diagrammatic chart illustrating the characteristics of a conventional super regenerative bandpass receiver, as well as a super heterodyne bandpass receiver as utilized in the present invention.

Referring now to FIG. 1, the characteristics of a conventional super regenerative bandpass and receiver are illustrated and compared to that of a super heterodyne bandpass receiver. Graph 10 generally illustrates a frequency to signal strength indication and graphically depicts the bandpass frequency of a super regenerative receiver 12 in contrast to the bandpass characteristics of a super heterodyne receiver 14. A radio frequency (RF) wave signal is indicated at 16. It should be assumed that RF signal 16 is a select RF signal which a particular radio repeater desires to receive.

As illustrated in FIG. 1, the conventional super regenerative receiver has a relatively large bandpass, for example approximately 6 Mhz. In comparison, the super heterodyne receiver of the present invention is a narrow bandpass receiver, for example approximately 100 Khz, as illustrated by bandpass 14.

FIG. 1 indicates that although a select RF signal 16 would be within the bandpass of a super regenerative receiver, that same signal 16 would not be received by the relatively narrow super heterodyne receiver 14, as there is no coincidence of the RF signal 16 within the window of the super heterodyne receiver. Thus, as is utilized in the present invention, a circuitry using a super heterodyne receiver must provide a means for scanning a select frequency bandwidth such that the receiver can tune itself to the frequency of select RF signals. This will be further described in detail hereinafter.

Figure 2:
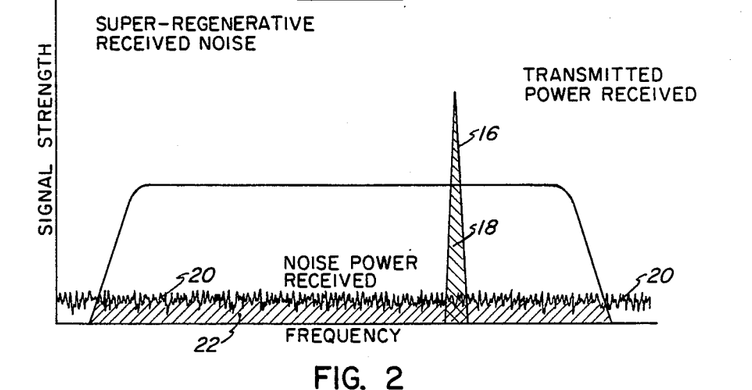
FIG. 2 is a diagrammatic chart illustrating a conventionally used super regenerative receiver in which there is a very high signal-to-noise ratio of RF reception; hetrodyne receiver as utilized in the present invention which depicts the vastly improved signal-to-noise ratio of received RF signals.

Referring now to FIG. 2, it can be seen that a super regenerative conventional receiver has inherent problems in that there is a very large signal-to-noise ratio of any received RF signals. Dashed areas under the curves indicate how this signal-to noise ratio would have a large value. RF signal 16 is seen to have a total amplitude which would determine by the cumulative area under the curve 16 as defined by area 18. Background noise level 20, would also have a cumulative value, within the particular frequency window, of the entire area under noise curve 20 defined by cumulative area 22. The super regenerative receiver has an inherently small signal-to-noise ratio which detracts from, and inherently impedes the reception of desired RF signals.

Figure 3:
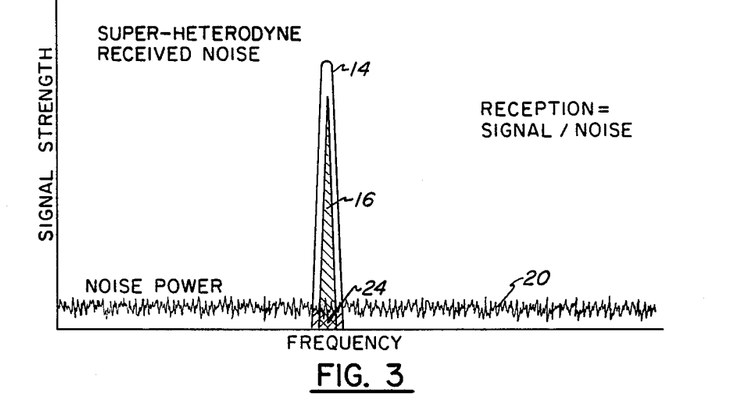
FIG. 3 is a diagrammatic chart illustrating a super hetrodyne receiver as utilized in the present invention which depicts the vastly improved signal-to-noise ratio of receiver RF signals.

In comparison to FIG. 2, FIG. 3 diagramatically represents the reception of a super heterodyne receiver as utilized in the present invention. It can be seen that the signal-to-noise ratio of the received signals is greatly improved as the area underneath the super heterodyne bandpass window 14 is compared to the cumulative noise value 24 defined by the integration of the total noise within noise curve 20. It can be seen that the signal-to-noise ratio of the super heterodyne receiver is of several magnitudes larger than the signal-to-noise ratio of the super regenerative receiver. This is a result of the relatively narrow bandpass window which is utilized in a super heterodyne receiver in seeking particular RF signals. The problem overcome in the present invention is of coinciding the super heterodyne bandpass window with the frequency of transmitted RF signals. It is understood that the frequency of low cost transmitters, such as utilized in the security industry, frequently exhibit drift characteristics such that any super hetrodyne receiver must have the ability to scan a select frequency bandpass while searching for select RF signals. The invention has overcome this problem by incorporating an intelligent, digital monitoring system which is a microprocessor control circuitry that allows the receiver to automatically scan a select frequency bandwidth and fine tune the hybrid electronic radio receiver in response to the presence of particular RF signals. The digital control system comprises a control means which is capable of discerning information from the transmitted RF signals and generating specific responses thereto.

Figure 4:
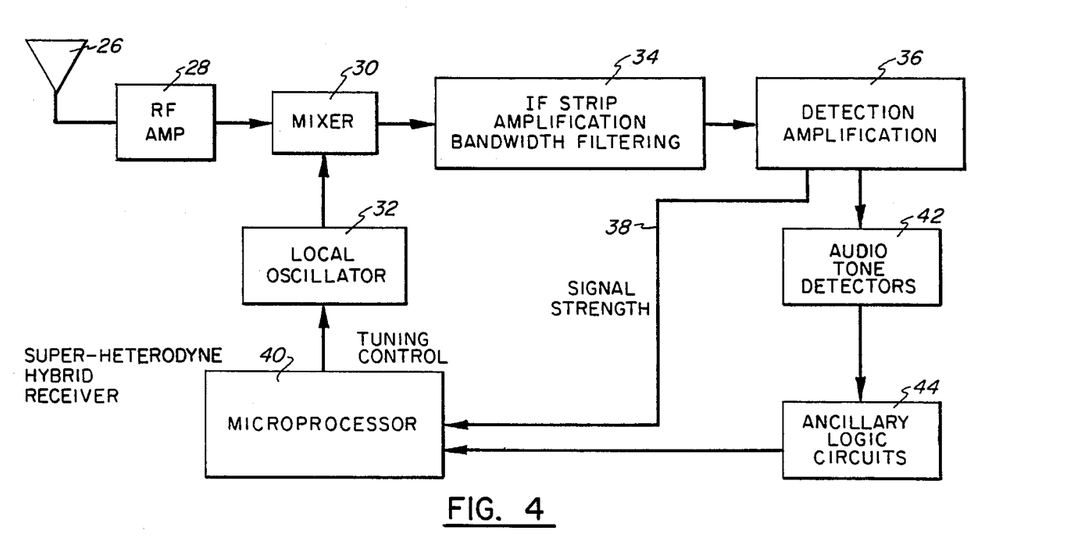
FIG. 4 is an electrical block diagram illustrating the super heterodyne hybrid receiver utilized in the present invention.

Referring now to FIG. 4, an electrical block diagram is shown which generally illustrates the principles of the invention utilizing a super heterodyne hybrid receiver. Signals are received at antenna means 26 and amplified by RF amp 28. They are then introduced to mixing means 30. Mixing means 30 includes local oscillator means 32. Mixing means 30 combines the received RF wave signals with the frequency generated by local oscillator 32, and introduces an intermediate frequency (IF) wave signal to IF amplifier means 34. IF amplifier 34 includes a detection, amplification, and signal strength level generation indication in circuitry 36. Signal strength level indicator or generator 38 is then transmitted to control means 40. Control means 40 is an intelligent unit capable of discerning information and generating specific responses thereto. Control means 40, in a specific embodiment, is a microprocessor which operates in conjunction with an analog-to-digital converter, a digital-to-analog converter, an interface data bus, as well as support circuitry. The control means will be described in greater detail hereinafter. In response to the signal strength level indication 38, the microprocessor 40 generates tuning control data 45 which is utilized to scan and fine tune the super hetrodyne hybrid receiver of the invention.

The invention also includes audio tone detector means 42 which receives the modified intermediate frequency signals and generates enabling signals in response thereto. Ancillary circuit means 44 are enabled as a result of the audio tone detectors 42 themselves, and sends the final signals to the microprocessor control means 40, for parity and validity verification.

Figure 5:
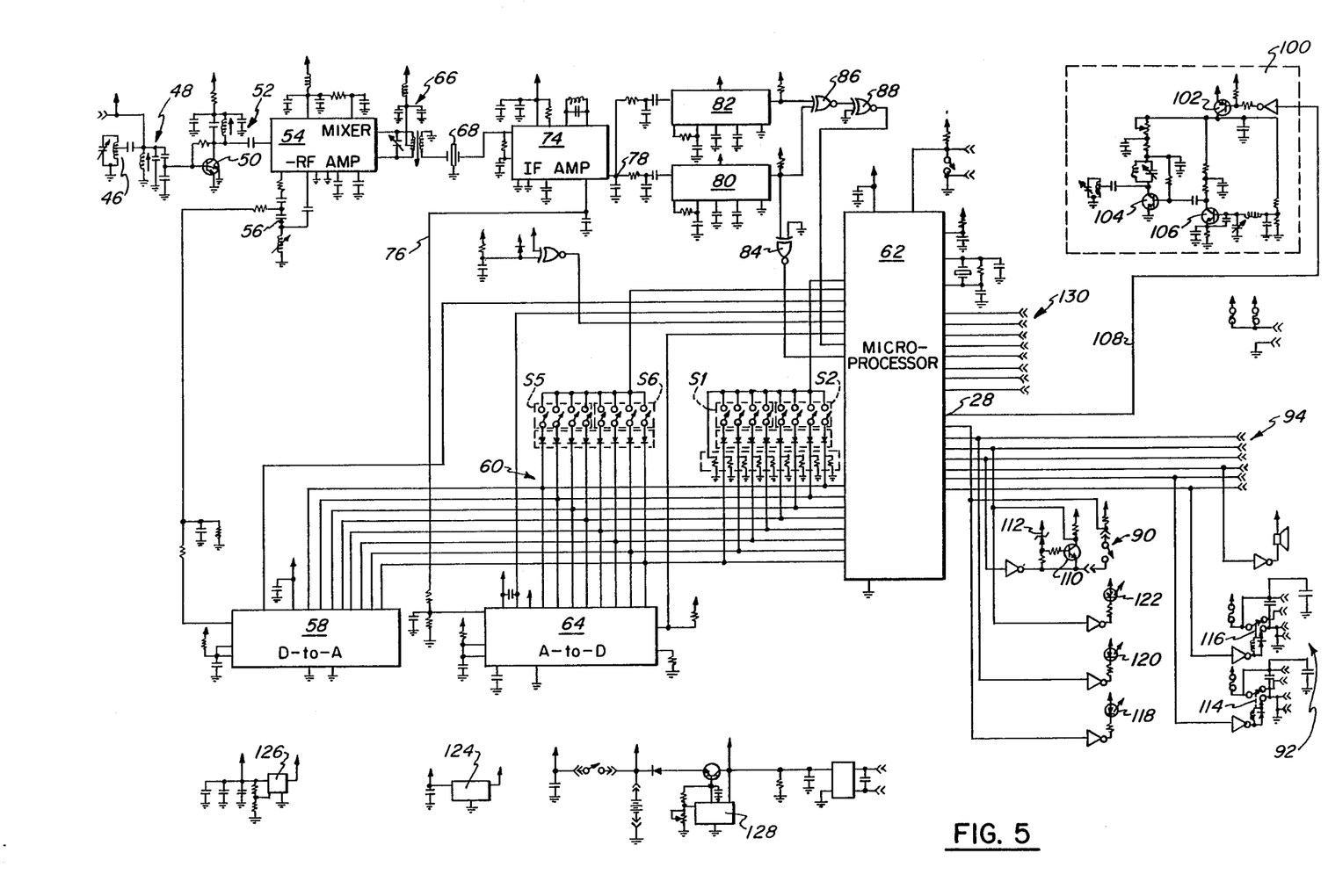
FIG. 5 is an electrical schematic diagram of the improved hybrid electronic radio repeater.

Referring now to FIG. 5, the details of the electrical schematic of the invention will be described. The receiving circuit is a radio receiver that has been blended and interfaces with a microprocessor which is mandatory to the receiver's operation. A high Q antenna 46 receives only a narrow band of signals, e.g., 10 Mgz. The signal is passed by filter network 48 to an RF amplifier 50. The amplifier passes the amplified signal through a tuning circuit 52 to mixing means 54. Mixing means 54 is an integrated circuit which is a multifunction block that performs the functions of local oscillator, mixer, and RF amplifier all in one device. Using varactor 56, the local oscillator can be tuned by a DC voltage. The DC voltage is produced by a digital-to-analog converter 58 which is connected by interface data bus 60 to control means 62. Control means 62 includes digital-to-analog converter 58, analog-to-digital converter 64, as well as interface data bus 60. Control means 62, in a specific embodiment, is a microprocessor capable of performing functions as hereinafter described. As illustrated in FIG. 5, microprocessor 62 controls the data input to digital-to-analog converter 58, which in turn controls the voltage to varactor 56 and thereby controls the voltage of the local oscillator within mixing means 54.

The unit's microprocessor 62 sends eight (8) bit binary words to the digital-to-analog converter 58 in order to tune the receiver, therefore the tuning of the hybrid radio receiver of the invention is under the direct control of microprocessor 62. It is thus apparent to those skilled in the art that the present invention utilizes digital control circuitry as a control means for providing an intelligent, discriminating receiver which is capable of scanning any desired frequency bandwidth in search of particular RF signals. It is also apparent that as the present invention utilizes a digital control circuitry, the system is capable of discriminating between digital data transmitted in the RF signals, decoding said digital data, and generating or initiating specific transmissions in response thereto. It is obvious that these transmissions can incorporate the digital data that was received in the RF signals, or alternatively, the digital control circuitry can initiate the transmission of discrete, original digital data in response to any received information. The invention has the ability to make decisions in response to specific stimulus.

The output of RF IC 54 is a signal of intermediate frequency (IF) which is determined by the byproduct of mixing the local oscillator frequency with that of the incoming RF signals as received. In a specific embodiment the invention tunes the local oscillator to produce an IF signal of 10.7 Mhz. This choice is made because of the general availability of ceramic filters on this frequency and economic considerations thereto. It should be observed, however, that an IF signal of any frequency can be generated through the control of the microprocessor as described above.

The signal passes from RF IC 54 through a tuning and filtering circuit 66 to a first ceramic filter 68. Ceramic filters enable a direct control over the bandpass of the receiver. In a specific embodiment the bandpass is 100 Khz. The RF signals are then introduced to IF amplification means 7. Intermediate frequency amplifier means 74 detects, amplifies, and generates a signal strength level indication in response to the select RF signals introduced. IF amplifier means 74 is an integrated circuit chip performing the above functions. The signal strength level indication is generated by this integrated circuit and transmitted to an analog-to-digital converter 64. Analog-to-digital converter 64, on request, converts the analog signal strength level indication as generated into an eight bit binary word which is then transmitted to control means 62. Since the signal strength level indication voltage is in direct proportion to the strength of the incoming RF signals, microprocessor 62 is cognizant of the strength of all received RF signals. The microprocessor, through software programming, can therefore generate intelligent responses to received RF signals.

The signal strength level indications are generated by IF amplifier means 74 along signal line 76.

IF amplifier 74 transmits audio signals of the received RF signals along line 78 and introduces the same to audio tone detector means 80 and 82. Audio tone detector means 80 and 82 are two tone decoder detector integrated circuit chips. The signals that are received by the two tone decoder detectors are data pulses made up of one of two particular audio tones, in a specific embodiment, 14 Khz and 23 Khz. These tones are detected by one of the two integrated circuit chips 80 or 82, and sent to an exclusive NOR gate integrated circuit 84. The exclusive NOR gate buffers one of the tone outputs and sends it on to microprocessor 62. The exclusive NOR gate also combines the tone outputs and sends the combination to the microprocessor through exclusive NOR gates 86 and 88. The exclusive NOR gate combines in the following manner:

1. Binary numeral 1 is sent if one and only one tone filter is generating a tone detect signal.
2. Binary numeral 0 is sent if neither or both tone filters are generating a tone detect signal. The signals presented to microprocessor 62 are therefore synchronization and parity signals.

The improved hybrid radio repeater receiver of the present invention operates on the principles that a narrow band receiver inherently receives less noise than a conventional super regenerative receiver that is normally used in the security systems industry. Since transmitters that are conventionally utilized are of extremely low cost, they do not have a crystal oscillator, nor other device which accurately fixes the frequency of transmitted signals. These low cost transmitters are subject to "frequency drifting". The super regenerative receivers are inherently wide band, e.g., 6 Mhz at these frequencies. This allows the transmitter to drift and still allows RF signals to be received. However, the super regenerative receivers have inherent problems as they also allow 6 Mhz of noise to be received along with the preferred signals.

Super heterodyne receivers as utilized in the invention are narrow band receivers, e.g., 100 Khz. The present invention utilizes a signal-to-noise ratio as a masking element to greatly improve the reception of preferred RF signals. This allows low cost transmitters operating at a great distance from the receiver to be received even in the presence of relatively large noise levels. This is because the invention utilizes a digital control circuitry system which allows the system to scan a relatively wide bandwidth frequency searching for particular, select desired RF signals. Once the receiver senses the presence of desired RF signals, the microprocessor causes the receiver to lock onto the desired RF signal, improves the signal-to-noise ratio thereof, and enhances reception in several aspects. Since the FCC limits the maximum output of a Part 15 transmitting device, the present invention vastly improves the range of such transmitters by the elimination of noise and the enhancing characteristics of the receiver.

Since low cost transmitters drift, a narrow band receiver presents a problem of reception. If a transmitter has drifted in its frequency output from the limits that a receiver can detect RF signals, no such RF signals can be recognized. The present invention solves this problem by controlling the "tuning" of the receiver by a control means, i.e., a microprocessor operating in conjunction with digital control circuitry. Microprocessor 62 controls and enables a search pattern which scans a predetermined bandwidth frequency in search of select RF signals.

Figure 6:
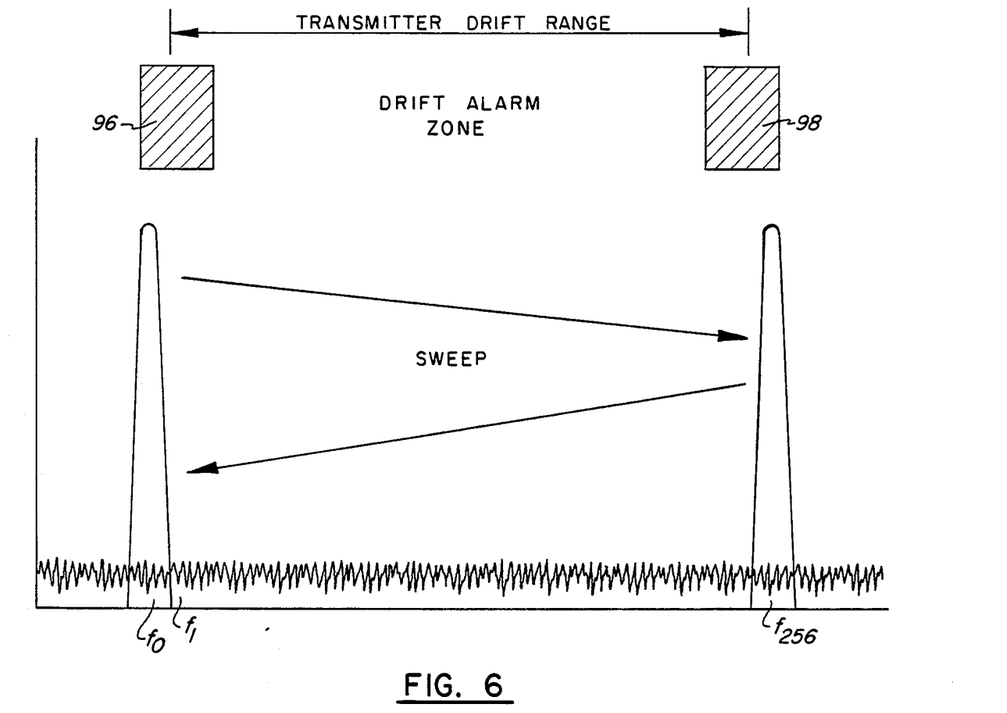
FIG. 6 is a diagrammatic chart illustrating the scan characteristics of the present invention.
Figure 7:
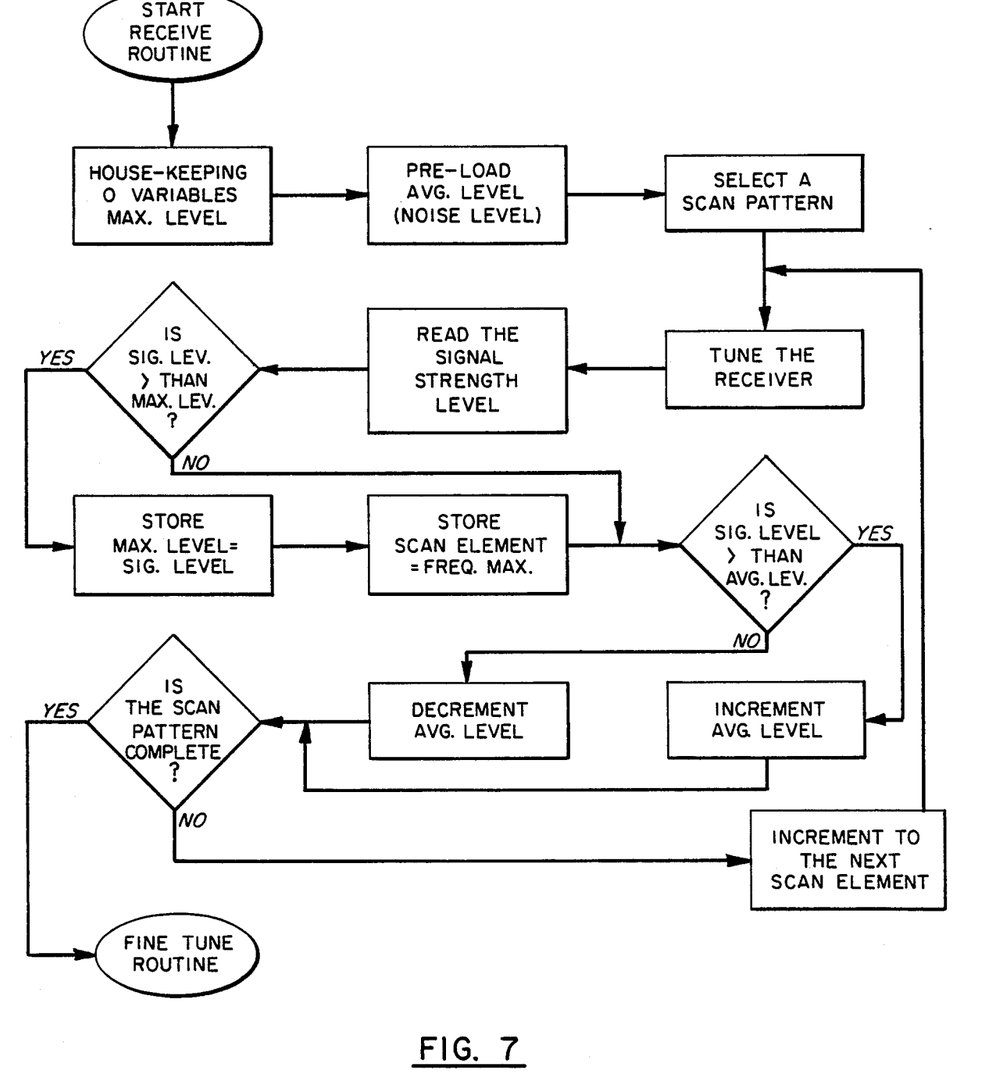
FIG. 7 is a software flow chart illustrating the receive routine.
Figure 8A:
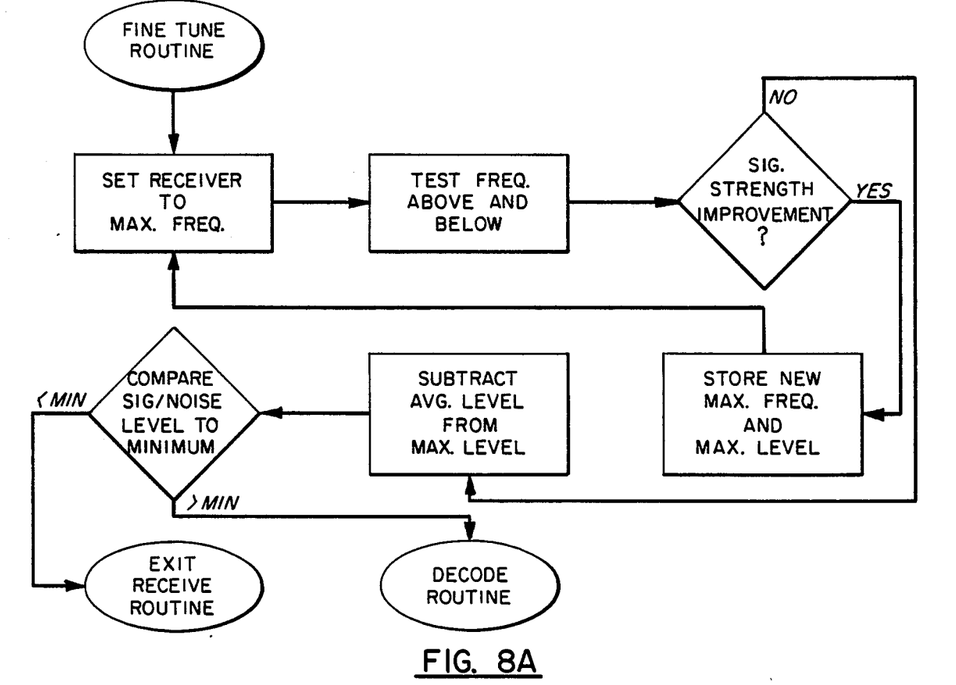
FIG. 8A is a software flow chart illustrating the fine tune routine.
Figure 8B:
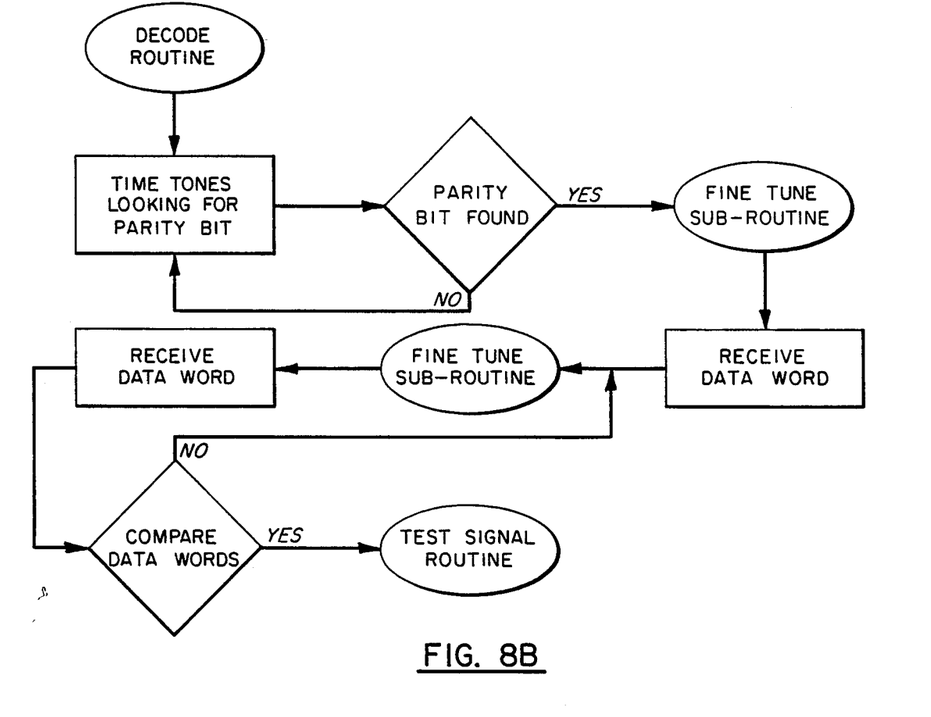
FIG. 8B is a software flow chart illustrating the decode routine.
Figure 8C:
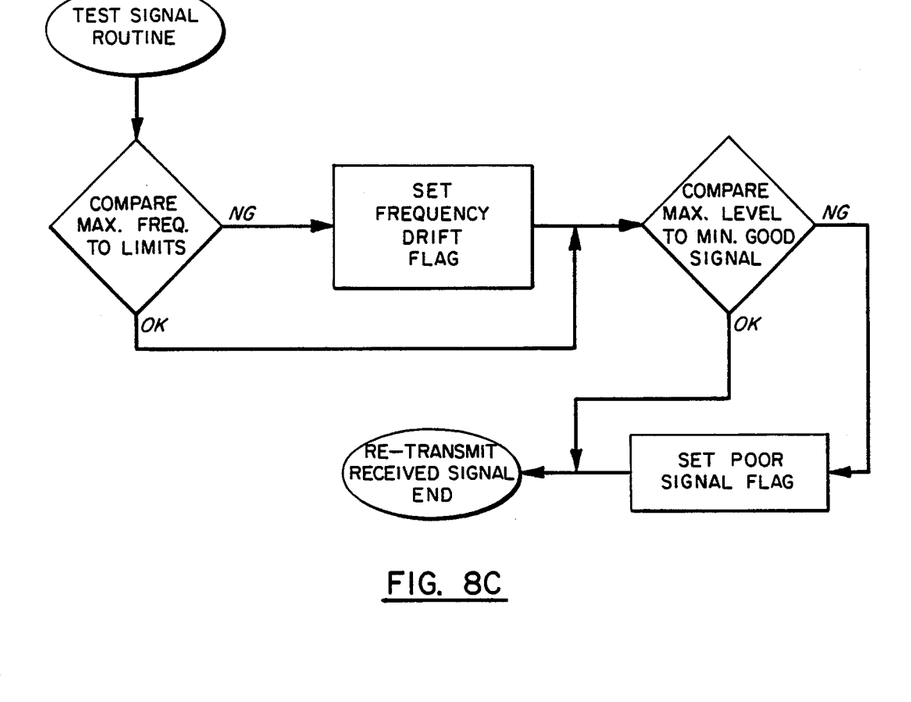
FIG. 8C is a software flow chart illustrating the test signal routine.

FIG. 6 illustrates the general scan sweep of the receiver controlled by microprocessor 62. As indicated, the receiver scans a frequency bandwidth determined by a first frequency F0 to a second frequency F1 and continues a sweep therethrough. Once the receiver detects the presence of select RF signals, the microprocessor can cause the receiver to lock onto the same.

To determine if a select RF signal is present during a search, microprocessor 62 is reading the signal strength level indication present on line 76 as described hereinabove. Microprocessor 62 reads this signal strength level indication at each step of the scan. Once a search pattern is complete, microprocessor 62 stores the peak value of the signal strength level indication, and the frequency position corresponding thereto, and stores these values in memory. As indicated above, microprocessor 62 controls the frequency of the local oscillator within mixer means 54. Microprocessor 62 also generates and stores a background noise value. This is generated by using a starting noise number at the beginning of the search, and at each step adding numeral 1 to the number if the signal strength level indication is higher than the number (regardless of the amount greater) and subtracting numeral 1 from the number if the signal strength level indication is less. The resulting arbitrary noise number, at the end of the search, is subtracted from the peak signal strength level indication value to determine the signal-to-noise ratio. If this signal-to-noise ratio is large enough to indicate that a signal is receivable, microprocessor 62 sends the peak signal's local oscillator frequency position to the local oscillator within IC 54, thereby tuning the improved hybrid receiver to the sensed frequency of the select RF signal. Microprocessor 62 then initiates a "slow scan" in the area of the signal peak to "fine tune" the hybrid receiver.

The benefit of this method is that if a particular transmitter has drifted outside of the receiver's search range, microprocessor 62 would become aware this fact and forward an alarm enabling signal which would indicate that a source transmitter has drifted in frequency beyond acceptable limits. It is thus possible to set up "drift guard zones", in response to which microprocessor 62 can initiate ancillary circuit means 90 or 92, as well as enable peripheral support equipment through an interface port means 94, all of which will be described further in detail hereinafter.

FIG. 6 illustrates the presence of drift alarm zones located at the outer extremes defined by F0 and F256. These drift alarms are indicated at 96 and 98. The frequency values at the extremes of 96 and 98 also define the transmitter drift range as indicated.

FIGS. 7, 8A, 8B, and 8C are software flow charts which illustrate the receive routine, the fine tune routine, the decode routine, and the test signal routine, respectively, of the present invention. These figures illustrate in software hierarchy, the processing of the present invention, utilizing the circuitry, components, and process as described above.

Another benefit of the present invention is that microprocessor 62 has stored the peak signal strength level indication value of an incoming signal. If all the transmitters utilize in transmitting the source status and control information were originally installed at a range that the signal strength was adequate for good reception, then a signal strength guard band could be generated in microprocessor 62. If a received RF signal indicates a signal strength level indication which is lower than a predetermined value, microprocessor 62 could enable an alarm to be generated which would indicate that a transmitter is losing range or drifting beyond acceptable limits. An operator could be aware of the problem before a transmitter signal is actually lost. This will enable an operator to determine the source of a transmitter problem and initiate maintenance of said transmitter prior to completely losing the transmitter and going off the air. Low signal strength can be caused by several factors such as a low battery, a transistor or other portion of a circuit breaking down, or an operator changing the environment such as introducing metalized wallpaper which would degrade the transmission of specific data. By allowing the microprocessor to automatically sense transmitter malfunctions, the present invention automatically allows for monitoring such transmitters, as well as responding with specific data transmissions.

Transmitter means 100 is shown as including transistors 102, 104 and 106. Microprocessor 62 provides a formatted and modulated signal at pin 28 along signal line 108 to transistor 102. Transistor 102 turns on and off the power to the transmitter stage. Transistor 106 is an oscillator which oscillates at 300 Mhz whenever power is supplied through transistor 102.

This transmitter is unique in the use of the microprocessor stage 62. The microprocessor: (1) determines what signal would be sent; (2) decides how that signal should be formatted as binary; (3) determines the pattern of tones and no tone bursts and parities to be sent; (4) decides the priority of the signal and adjusts the length of the transmission accordingly; and (5) serializes the data and outputs it to the transmitter stage. Since all tone generation, timing and formatting is derived from the microprocessor's highly accurate clock, the microprocessor based transmitter is more stable with fewer parts than a conventional transmitter.

Ancillary circuit means 90 is a battery level testing circuit utilizing transistor 110. This circuit is enabled by microprocessor 62 and returns an indication of whether the battery level is lower than a voltage determined by reference to diode 112. This ancillary circuit 90 is under microprocessor control to eliminate the power usage of the circuit when a battery check is not required.

Ancillary circuit means 92 is a relay circuit incorporating relays 114 and 116. These relay outputs are either switched with 12 volts or dry contact. These ancillary relay circuits are used to remote control any particular desired switching function and enable the activation of other ancillary circuits or equipment under the direct control of microprocessor 62 as indicated in FIG. 5.

It is to be understood by those skilled in the art that microprocessor 62 can generate the enablement of ancillary circuit means in response to any received data. Thus, if the microprocessor receives a data stream which would indicate the presence or activation of a smoke detector or fire alarm, the microprocessor could enable circuitry which would activate water sprinkling systems or other fire extinguishing devices. Numerous other ancillary circuit means will come to mind to those skilled in the art, all of which would be exemplified by the standard characteristic of the microprocessor enabling or activating the ancillary circuits in response to data received through RF signal transmissions.

Further referring to FIG. 5, switches S1, S2, S5, and S6 are utilized to enable manual input of data to the microprocessor can use this data to determine special transmission codes, special accessory features, or to enable a particular processor program to be run.

Light emitting diodes 118, 120 and 122 are status indicators. These indicators are also under the control and enablement of microprocessor 62, and can be utilized in response to any status or control data received by said microprocessor. For example, a particular light emitting diode can be utilized to indicate that a repeater is part of an RF link. An LED can stay lit if RF signals are received and retransmitted at least once every ten seconds. This LOCK INDICATOR would be a unique status indication, and likewise would be controlled by the digital control circuitry responding to a particular received data transmission.

A power monitor circuit allows microprocessor 62 to monitor if a power outage has occurred for an excessive amount of time. This circuit is specifically used to locate circuit breakers that are being turned off at night to avoid damage to the repeaters internal batteries.

Onboard power regulators 124, 126, and 128 regulate the 5 volt, 10 volt, and 13.8 volt power supplies.

Connector J1 as indicated at 130, is an interface port means which allows control means 62 to be interfaced with either ancillary support circuits or peripheral support equipment. In a specific embodiment, interface port 130 will be utilized to interface control means 62 with an alphanumeric display board or a printer. This would allow the status of various transmitters or conditions to be displayed or recorded remotely throughout a particular installation.

Microprocessor 62, in a specific embodiment, initiates the scan of a preselected bandwidth frequency by searching in 256 steps through a five (5) Mhz bandwidth. Microprocessor 62 initiates particular search scans of 20 Khz steps. Scanning controlled by the microprocessor is strictly a matter of the particular software desired. As is apparent to those of ordinary skill in the art, the microprocessor can allow conventional scans or exotic scans. The status and control information is transmitted within the audio components of the RF signals. The microprocessor 62 enables the measurement of the amplitude and frequency of transmitted signals, as well as the width and duration of any signals. Upon microprocessor 62 sensing the presence of select RF signals, microprocessor 62 initiates the scan of the receiver through or near the frequency which indicated the presence of the RF signal. Thus, microprocessor 62 controls the fine tuning of the improved hybrid radio repeater receiver. This enables the locking on of the preferred reception.

Because the microprocessor is an intelligent unit, it can discriminate between the presence of two (2) or more signals at different locations in the scan, and allows for the simultaneous reception of these discrete signals. This is a result of the narrow bandwidth of the receiver and the fine tuning capabilities of the microprocessor.

As is conventionally understood, there is a unique identification code within the binary data transmission of each RF signal. Security radio transmissions typically have approximately 20 bits of digital data which generally indicate the system identification, transmitter type identification, location identification, as well as data bits indicating control and status information. Microprocessor 62 of the present invention is an intelligent decision maker and can respond to any received data and digitally control a separate transmission either simulating the received signals, or generating discrete responses to any such received signal or signals. This is all made possible because an intelligent microprocessor was incorporated within a repeater.

An entire security system can be designed utilizing the present invention's hybrid radio repeaters. Any such system could include a main control panel, a particular number of radio repeaters, and numerous transmitters. A transmitter would be tripped from an external device such as a smoke detector, burglar sensor, waterflow switch, or other similar device. A low power signal is sent which is likely beyond the range of the main control panel. A hybrid repeater close to the transmitter receives the signal, checks the incoming signal strength, the transmitters frequency, and the content of the radio signal. The signal is modified to indicate the signal strength, and whether the frequency was or was not received properly, and then forwards the transmitted signal to the next repeater. The signal finally reaches the main panel and is displayed. Status conditions if out of tolerance are also displayed. After a particular hybrid repeater forwards a signal it may activate the relay outputs depending upon the particular programming desired. A common activation could be a fire signal which is detected and the relays which are connected to fire door closures, fire bells, air conditioner shutdowns, or other similar operations.

While there have been described above the principles of this invention in connection with specific apparatus, it is to be clearly understood that this description is made only by way of example and not as a limitation to the scope of the invention.

What I claim is:

1. An improved hybrid electronic radio repeater, comprising:
    antenna means, for receiving a select, narrow frequency band of radio wave signals;
    said radio wave signals being transmitted from a source, said radio wave signals containing source status and control information;
    radio frequency amplifier means, for filtering and amplifying said radio signals;
    mixing means, including local oscillator means, for combining said radio frequency signals with said local oscillator signals to produce intermediate frequency signals;
    tuning means for filtering, tuning, and controlling the bandpass of said intermediate frequency signals;
    intermediate frequency amplifier means, for detecting and amplifying said intermediate frequency signals, and for generating a signal strength level indication in response thereto; and
    control means, said control means including microprocessor means, said control means being an intelligent unit capable of discerning information and generating responses thereto, for monitoring said signal strength level indication, said control means also for initiating the scan of said narrow frequency band for the presence of select radio wave signals, said control means tuning said hybrid repeater in response to the presence of said select signals,
    said control means tuning said receiver by scanning a select frequency bandwidth, reading the signal strength level indicator at each scan location, storing maximum readings at each scan frequency corresponding thereto, storing noise data corresponding to each said reading, generating and storing a signal-to-noise ratio corresponding to each said reading, and fine tuning said receiver based upon a slow scan generated in response to said signal-to-noise readings.

2. The apparatus of claim 1, further comprising:
    audio tone detector means, responsive to said intermediate frequency amplifier means, for detecting select audio tones and indicating the presence of said tones to said control means, said control means utilizing said tone indications for synchronization and parity.

3. The apparatus of claim 1, further comprising:
    transmitter means, for transmitting radio wave signals, said transmitter means being initiated by, and under the control of, said control means, said control means capable of initiating the transmission of radio waves simulating said received select radio waves, and said control means capable of initiating the transmission of discrete, original radio waves in response to said received select radio waves.

4. The apparatus of claim 1, further comprising:
    ancillary circuit means, said ancillary circuit means being initiated by, and under the control of, said control means, for performing one or more of the functions taken from the group including battery level monitor, switch enables, remote control relay enables, status indicators, or power monitors.

5. The apparatus of claim 1, further comprising:
    interface port means for interfacing said control means with peripheral support equipment, said peripheral support equipment being initiated by, and under the control of, said control means.

6. The apparatus of claim 1 wherein said radio frequency amplifier means comprises an RF transistor and ancillary biasing and filtering components.

7. The apparatus of claim 1 wherein said mixing means comprises an integrated circuit, said integrated circuit having a local oscillator, said local oscillator being tuned by a DC voltage, said DC voltage being determined by said control means, said integrated circuit having an RF mixer and an RF amplifier.

8. The apparatus of claim 1 wherein said intermediate frequency amplifier means comprises an integrated circuit, said integrated circuit having an IF amplifier, a detector, an audio amplifier, and a signal strength level indicator, said signal strength level indicator being a signal generated in proportion to the strength of a select received signal.

9. The apparatus of claim 1 wherein said control means comprises digital control circuitry, said control means converting analog signals to a digital data format, processing said converted data and generating receiver control data in response thereto, said control means including a microprocessor, an analog to digital converter, a digital to analog converter, and a digital data interface bus.

10. The apparatus of claim 9 wherein said microprocessor tunes said receiver by scanning a select frequency bandwidth, reading the signal strength level indicator at each scan location, storing maximum readings at each scan frequency corresponding thereto, storing noise data corresponding to each said reading, generating and storing a signal-to-noise ratio corresponding to each said reading, and fine tuning said receiver based upon a slow scan generated in response to said signal-to-noise readings.

11. An improved, hybrid electronic radio repeater, including an intelligent digital control unit capable of discerning information and generating control data in response thereto, said receiver capable of initiating and controlling ancillary circuitry and equipment in response to received data, and further facilitating digital telemetry, comprising:

an antenna, said antenna receiving select, narrow frequency bands of radio wave signals, said radio wave signals being transmitted from discrete sources, said radio wave signals containing source status and control information;

a radio frequency amplifier, for filtering and amplifying said received radio signals, said amplifier being an RF transistor and ancillary biasing and filter components;

an RF mixer, said RF mixer being an integrated circuit, said integrated circuit having a local oscillator, said local oscillator being tuned by DC voltage, said integrated circuit having an RF mixer and an RF amplifier;

an intermediate frequency amplifier, said intermediate frequency amplifier being an integrated circuit, said integrated circuit having an IF amplifier, a detector, an audio amplifier, and a signal strength level indicator, said signal strength level indicator being a signal generated in proportion to the strength of a select received signal;

a control unit, said control unit being an intelligent unit capable of discerning information and generating responses thereto, said control unit facilitating digital telemetry, said control unit capable of initiating the scan of said narrow frequency band for the presence of select radio wave signals, said control unit tuning said hybrid radio repeater in response to the presence of said select signals, said control unit comprised of digital control circuitry, said control unit converting analog signals to a digital format, processing said converted data and generating receiver control data in response thereto, said control unit including a microprocessor, an analog-to-digital converter, a digital-to-analog converter, and a digital data interface bus, said microprocessor tuning said receiver by scanning a select frequency bandwidth, reading the signal strength level indicator at each scan location, storing maximum readings at each scan frequency corresponding thereto, storing noise data corresponding to each said reading, generating and storing a signal-to-noise ratio corresponding to each said reading, and fine tuning said receiver based upon a slow scan generated in response to said signal-to-noise readings;

audio tone detectors, said audio tone detectors being integrated circuits which detect select audio tones received from said intermediate frequency amplifier, said audio tone detectors generating signals which indicate the presence of select audio tones, said control unit receiving said audio tone indications, said control unit utilizing said audio tone indications for synchronization and parity;

a transmitter, said transmitter being initiated by, and under the control of, said control unit, said control unit capable of initiating the transmission of radio waves simulating said received select radio waves, and said control unit capable of initiating a transmission of discrete, original radio wave signals in response to said received select radio wave signals; and ancillary support circuits, said ancillary circuits being initiated by, and under the control of, said control unit, said ancillary control circuits performing one or more of the functions taken from the group which include battery level monitor, switch enables, remote control relay enables, status indicators, or power monitors.

12. A process for receiving and repeating radio wave signals, said process including intelligent data recognition and controlled responses thereto, comprising:

receiving select, narrow bands of radio wave signals transmitted from discrete sources, said signals containing source and status information;

amplifying, filtering and tuning said received signals;

mixing said received RF signal with a local oscillator frequency to produce intermediate frequency signals;

filtering and tuning said IF signals to a select bandpass frequency;

detecting and amplifying said IF signals, and generating signal strength level indicators in response thereto;

digitally monitoring said signal strength level indicators and recording peak values and frequency reading corresponding thereto;

storing background noise data corresponding to each said signal strength level indicator and calculating a signal-to-noise ratio corresponding thereto;

digitally controlling the scan and fine tuning of said select, narrow bands of radio wave signals based upon said signal-to-noise ratios; and transmitting RF signals in response to said received, select radio wave signals;

whereby, an intelligent, digital monitoring circuit automatically controls the scan and fine tuning of a radio receiver to maximize the reception of distant source signals and enables the generation of intelligent transmissions in response thereto.

13. The process of claim 12 further comprising:
processing said IF signals through audio tone detection circuitry, and utilizing said audio tone indications to digitally synchronize the tuning of said receiver and for digital parity of said digital processing system.

14. The process of claim 12 further comprising:
digitally controlling ancillary circuitry and peripheral support equipment in response to received status and information data.

15. The process of claim 12 further comprising:
digitally establishing drift alarm zones which indicate the rift of a transmitters output frequency beyond acceptable limits, and through said digital monitoring system, automatically sensing an unacceptable output signal and initiating an alarm in response thereto.

16. The process of claim 12, further comprising:
simultaneously recognizing two or more of said select received RF signals, said recognition by said digital monitoring circuit during said scanning and fine tuning of said narrow frequency bandwidth.

17. The process of claim 12, further comprising:
digitally detecting extraneous jamming signals and digitally generating alarm signals to indicate said jamming attempt.

18. The process of claim 12, further comprising:
transmitting RF test signals from said sources, said test signal containing source status and control information, digitally processing said test signals for verification, and generating transmitted RF signals in response thereto.

19. The process of claim 12, wherein an RF amplifier amplifies, filters and tunes said received radio wave signals in cooperation with biasing and filtering components;
- a radio frequency integrated circuit accomplishes said mixing, wherein said RF IC contains a local oscillator, a mixer, and an amplifier;
- the frequency of the local oscillator being determined and tuned by an external DC voltage, said DC voltage being determined by said digital monitoring system;
- a second RF integrated circuit accomplishing said detection and amplification of said intermediate frequency signals, and generating said signal strength level indicator in response thereto;
- said second RF IC being an audio amplifier.

20. The process of claim 12, wherein a microprocessor, in conjunction with an analog-to-digital converter, a digital-to-analog converter, and a digital interface data bus communicating therebetween, digitally monitors said signal strength level indicators, records said peak values and frequency readings, stores background noise data corresponding thereto, calculates a signal-to-noise ratio corresponding thereto, and digitally controls the scanning and fine tuning of said select, narrow frequency bands of radio wave signals based upon said signal-to-noise ratios, said microprcessor representing an intelligent, digital monitoring unit which automatically controls the scan and fine tuning of said radio receiver, said microprocessor automatically controlling the tuning of said local oscillator thereby fine tuning the frequency of said receiver, said microprocessor initiating the transmission of RF signals in response to said select received RF signals.

* * * * *